(12) United States Patent
Nielsen

(10) Patent No.: US 6,373,502 B1
(45) Date of Patent: Apr. 16, 2002

(54) METHOD AND APPARATUS FOR FACILITATING POPUP LINKS IN A HYPERTEXT-ENABLED COMPUTER SYSTEM

(75) Inventor: Jakob Nielsen, Atherton, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 08/673,527

(22) Filed: Jul. 1, 1996

(51) Int. Cl.[7] .............................................. G06T 11/00
(52) U.S. Cl. ....................................................... 345/708
(58) Field of Search ................................. 395/133, 139; 345/433–439, 708

(56) References Cited

U.S. PATENT DOCUMENTS

| 5,408,655 A | 4/1995 | Oren et al. |
| 5,524,193 A | 6/1996 | Covington et al. |

FOREIGN PATENT DOCUMENTS

| JP | 02 207399 | 8/1990 |

OTHER PUBLICATIONS

Aronson "HTML 3 Manual of Style" pp 40–49, 62, 63, 112–119 (1995).*

Howlegg "Powerful Tool for Web Searching" *PC User*, No. 276, Feb. 20, 1996, p. 55.

Noll et al. "Integrating Diverse Information Repositories: A Distributed Hypertext Approach" *Computer*, vol. 24, No. 12, Dec. 1991, pp 38–45.

Nielsen "The Art of Navigating Hypertext" *Communications of the Association for Com–puting Machinery*, vol. 33, No. 3, Mar. 1990, pp 296–310.

Akscyn et al. "KMS: A Distributed Hypermedia System for Managing Knowledge in Organizations" *Communications of the Association for Computing Machinery*, vol. 31, No. 7, Jul. 1988, pp 820–835.

Ishikawa "An Object–Oriented Knowledge Base Approach to a Next Generation of Hypermedia System" Computer Society International Conference, Spring Meeting, Feb. 26–Mar. 2, 1990, pp 520–527.

* cited by examiner

*Primary Examiner*—Almis R. Jankus
(74) *Attorney, Agent, or Firm*—McDermott, Will & Emery

(57) ABSTRACT

Apparatus, methods and computer program products are disclosed that implement a POPUP link on a web page. The invention extends HTML by adding a POPUP attribute to relevant HTML tags. This attribute causes a web browser application to automatically acquire and store strongly related information specified by the POPUP link. When the POPUP link is activated, the invention presents a POPUP window and renders the acquired information within the window without replacing the rendered web page that contains the POPUP link.

12 Claims, 12 Drawing Sheets

```
<!-- HEAD_START -->
<HTML>
<HEAD>
<TITLE>Sun Microsystems</TITLE>
<!-- META NAME-"owner" VALUE="hooper@bcci.eng.sun.com" -->
</HEAD>

<BODY>
<!-- HEAD_END -->

<A HREF=" /cgi-bin/imagemap/960101/homepage.9601.map"><IMG BORDER=0 SRC="/share/i
mages/homepage.9601.color.580x576.gif" ALT="Highly graphic homepage" ISMAP> </A> <
P>

Sun Microsystems <A HREF="/960101/index.textonly.html">text-only</A> home page.

<!--FOOT_START -->
<HR>
<FONT SIZE=2> Questions or comments regarding this service?
<A HREF="/cgi-bin/comment-form.p1?/960101/index.html"> <EM>webmaster@sun.com</EM>
</A> </FONT>
<P>
<H5> <A   HREF="/share/text/SMIcopyright.html">Copyright</A> 1996 Sun Microsystems,
   Inc., 2550 Garcia Ave., Mtn. View, Ca 94043-1100 USA.  All Rights Reserved</H5>
</BODY>
</HTML>
<!-- FOOT_END -->
```

Page 1

FIG. 3

```
<html>
<head>
<title>

</title>
</head>
<!-- this is a comment -->
<body>

<address>

</address>
</body>
</html>
```

FIG. 4

| <start tag> | <endtag> | function |
|---|---|---|
| <html> | </html> | HTML document indicator. |
| <head1> | </head> | Defines document head. |
| <title> | </title> | Document title information. Should be descriptive, used in indexing and search engines. |
| <body> | </body> | Document body |
| <h (n)>,<br><h1>...<h6> | </h (n)>,<br></h1>...</h6> | Headings. h1 is largest, h6 smallest |
| <! --- ---> | | Comment. No ending tag required |

FIG. 5

Paragraph Formatting

| <start tag> | <endtag> | function |
|---|---|---|
| <brl> | | Break, starts a new line, no ending tag required |
| <p> | | Paragraph (break plus space), no ending tag required Horizontal rule (horizontal line) |
| <hr> | | Horizontal rule (horizontal line) |
| <pre> | </pre> | Preformatted text, not processed by browser. Useful for keeping spaces in tables or lists formatted in a text editor. |
| <blockquote> | </blockquote> | Blockquote |

Character Formatting

| <start tag> | <endtag> | Logical or Physical | HTML function |
|---|---|---|---|
| <em> | </em> | Logical | *Emphasized* |
| <var> | </var> | Logical | Variable |
| <cite> | </cite> | Logical | Citation |
| <i> | </i> | Physical | *Italics* |
| <b> | </b> | Physical | Bold |
| <code> | </code> | Logical | Code |
| <samp> | </samp> | Logical | Sample |
| <kbd> | </kbd> | Logical | Keyboard entry |
| <tt> | </tt> | Physical | Teletype |
| <key> | </key> | Logical | Keyword |
| <dfn> | </dfn> | Logical | Definition |
| <strike> | </strike> | Physical | ~~Strike through~~ |
| <strong> | </strong> | Logical | Strong |

FIG. 6

THOMAS JEFFERSON

THOMAS JEFFERSON WAS ONE OF THE DRAFTERS OF THE AMERICAN CONSTITUTION.

FIG. 7

METHOD AND APPARATUS FOR FACILITATING POPUP LINKS IN A HYPERTEXT-ENABLED COMPUTER SYSTEM

FIELD OF THE INVENTION

Embodiments of the present invention relate to an improved method and system for facilitating display of information to a computer user.

BACKGROUND OF THE INVENTION

Most hypertext-enabled systems in use today only support replacement links. Replacement links are often represented on a web page as underlined text colored so as to distinguish the replacement links from the other text and graphics being displayed on the web page. When a user selects the replacement link (e.g., using a mouse), the system completely replaces the content currently being displayed in the browser window with content retrieved from a destination node associated with the replacement link. For example, if the user selects a replacement link for the NASDAQ stock market from the home page for CNN's Financial News Network, the home page for CNN's Financial News Network will be completely replaced by the home page for the NASDAQ stock market.

While replacement links work well for displaying completely new information that is only weakly related to content currently being displayed in the browser window, it would be beneficial to provide an improved method and system for displaying information which is "tightly coupled" or strongly related to content currently displayed to the user.

SUMMARY OF THE INVENTION

Embodiments of the present invention provide an improved method and system for facilitating the display of information to a user, In one embodiment a popup window is used to display new information to a user viewing a web page. In the preferred embodiment, popup links are represented by a POPUP extension to the HTML language. For example, an HTML anchor utilizing the teachings and suggestions of the present invention may be written as:

<a href=http://foo.com/bar.html POPUP> text of hotlink to display </a>.

In a preferred embodiment, when a browser enabled to process a popup link encounters an HTML tag with a POPUP attribute, the browser performs the following steps: 1) the browser retrieves the file "page.html" from the server "company.com", 2) the browser renders the file page.html on a display device, 3) the browser then retrieves data associated with one or more popup links referenced in the retrieved file, such as a second file and any embedded objects referenced by the second file. When the browser receives an activation of the popup link the browser displays the retrieved data in a popup window on the display device.

The popup window of the present invention is especially useful for displaying new information which is "tightly coupled" or strongly related to the information currently displayed to the user because it allows the user to view the new information within the context of the currently displayed web page. For example, much information is in the nature of annotations or comments to some primary information and would be better displayed within the context of the primary page rather than within the context of a completely new page.

Popup links of the present invention are an improvement over "replacement links" which completely replace a currently displayed web page with a new web page, because such complete replacement causes the user to lose the context within which the new information fits.

Notations and Nomenclature

The detailed descriptions which follow are presented largely in terms of methods and symbolic representations of operations on data bits within a computer. These method descriptions and representations are the means used by those skilled in the data processing arts to most effectively convey the substance of their work to others skilled in the art.

A method is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Useful machines for performing the operations of the present invention include general purpose digital computers or similar devices. The general purpose computer may be selectively activated or reconfigured by a computer program stored in the computer. A special purpose computer may also be used to perform the operations of the present invention. In short, use of the methods described and suggested herein is not limited to a particular computer configuration.

BRIEF DESCRIPTION OF THE DRAWINGS

FIG. 3 illustrates the HTML source code which describes the hypertext document of FIG. 2.

FIG. 4 is an example of a series of HTML document tags forming a template for a typical hypertext document.

FIG. 5 summarizes the information of FIG. 4 in a table format.

FIG. 6 illustrates additional tags for formatting characters and paragraphs.

FIG. 7 illustrates a hypertext document on Thomas Jefferson with a hot link named "the American Constitution".

DETAILED DESCRIPTION

Overview of the Preferred Method

Embodiments of the present invention provide an improved method and system for facilitating the display of information to a user. In one embodiment a popup window is used to display new information to a user viewing a web page. In the preferred embodiment, popup links are represented by a POPUP extension to the HTML language. For example, an HTML anchor utilizing the teachings and suggestions of the present invention may be written as:

<a href=http://foo.com/bar.html POPUP> text of hotlink to display </a>.

In a preferred embodiment, when a browser enabled to process a popup link encounters an HTML tag with a POPUP attribute (i.e., a popup anchor), the browser performs the following steps: 1) the browser retrieves the file "page.html" from the server "company.com", 2) the browser renders a popup link associated with the file page.html on a display device, 3) the browser then retrieves data associated with the popup anchor, such as a second file and any embedded objects referenced by the second file. When the browser receives an activation of the popup link, the browser displays the retrieved data in a popup window on the display device.

Popup windows of the present invention are especially useful for displaying new information which is "tightly coupled" or strongly related to the information currently displayed to the user because it allows the user to view the new information within the context of the currently displayed web page. For example, much information is in the nature of annotations or comments to some primary information and would be better displayed in the context of the primary page rather than requiring the user to view a completely new page. Popup links of the present invention are an improvement over "replacement links" which completely replace a currently displayed web page with a web page associated with a selected "hot link", because such complete replacement causes a user to lose the context within which the new information fits.

Overview of the Preferred System

Figure 1:
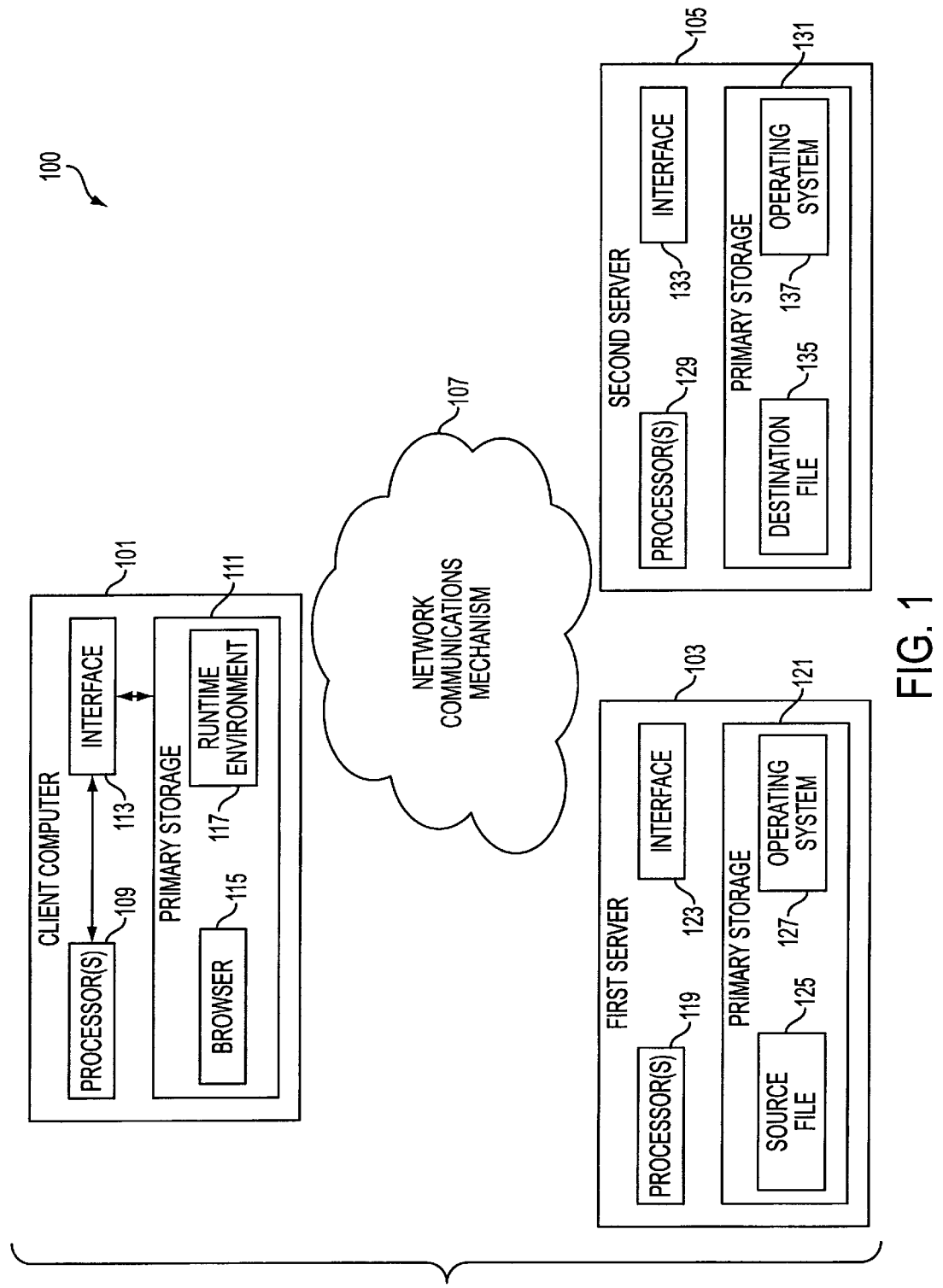
FIG. 1 is a block diagram of a computer system for practicing various embodiments of the present invention.

FIG. 1 is a block diagram of a computer system 100 for practicing embodiments of the present invention. The computer system 100 includes a client computer 101, a first server computer 103, a second server computer 105, and a network communications mechanism 107.

The client computer 101 includes a processor(s) 109, a primary storage 111, and an interface 113 for facilitating input and output in the client computer 101. The primary storage 111 stores a number of items, including a browser 115 and a runtime environment 117. The preferred browser is a Java™ enabled browser such as Hot Java™ from Sun Microsystems, Inc., of Mountain View, Calif. The runtime environment is code that provides at least the minimum environment within which the browser can operate. The preferred runtime environment is the Solaris™ operating system from Sun Microsystems, Inc.

1.Sun, Solaris, Java, and Hot Java are trademarks or registered trademarks of Sun Microsystems, Inc., in the United States and other countries.

The first server 103 includes a processor(s) 119, a primary storage 121, and an interface 123 for facilitating input and output in the first server computer 103. The primary storage 121 stores a number of items, including a source file 125, and an operating system 127. The preferred operating system is the Solaris™ operating system from Sun Microsystems, Inc. of Mountain View, Calif. The preferred source file is a text document interspersed with constructs of a hypertext-enabled language such as the HTML markup language. Another possibility would be a text document marked up with SGML (Standard Generalized Markup Language). In general, it is not required that the source file be encoded in HTML, it is preferred, however, that the source file contain code for at least one hypertext link (including one or more Universal Resource Locators). The text is preferably encoded in ASCII. For use with other languages, text may be encoded in Unicode (the preferred embodiment for non-European languages).

The second server 105 includes a processor(s) 129, a primary storage 131, and an interface 133 for facilitating input and output in the destination computer 105. The primary storage 131 stores a number of items, including a destination file 135, and an operating system 137. The preferred destination file is a text document which may be interspersed with constructs of a language that supports hypertext links (such as the HTML markup language). The preferred operating system is the Solaris™ operating system from Sun Microsystems, Inc. of Mountain View, Calif.

The network communications mechanism 107 provides a mechanism for facilitating communication between the client computer 101, the first server 103, and the second server 105.

It should be noted that the client computer 101, the first server 103, and the second server 105 may all contain additional components not shown in FIG. 1. For example, each computer could also include some combination of additional components including a video display device, an input device, such as a keyboard, mouse, or pointing device, a CD-ROM drive, and a permanent storage device, such as a disk drive.

The Hypertext Markup Language ("HTML")

Figure 2:
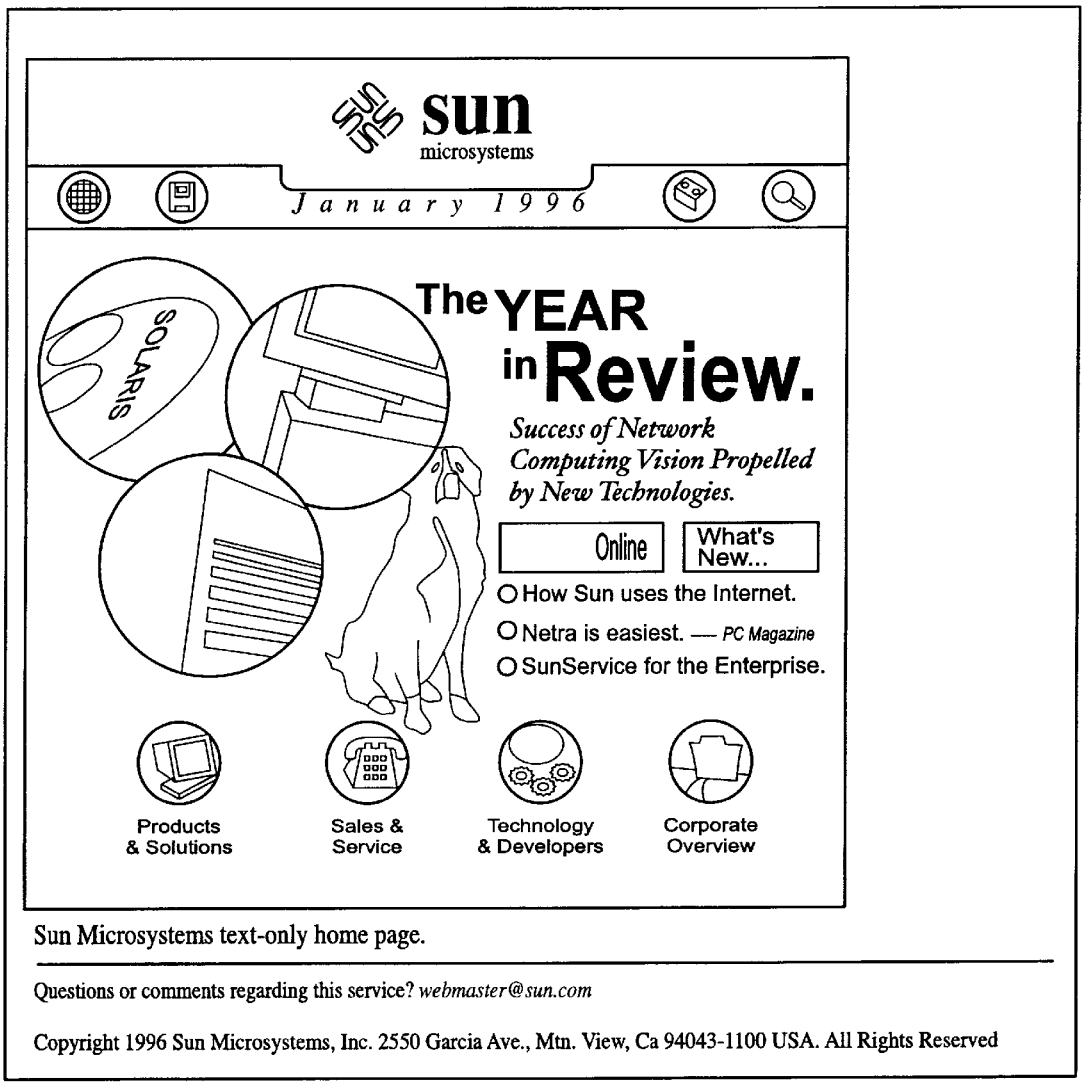
FIG. 2 is an example of a hypertext document from Sun Microsystems as viewed through a browser from Netscape Communications, Inc.

Since the preferred embodiment implements the teachings and suggestions of the present invention using a POPUP extension to the HTML language, it may be helpful to review the general features of the HTML language. HTML is a "markup" language which allows an author to turn a simple text document into a hypertext document for the World Wide Web ("the web"). FIG. 2 is an example of a hypertext document from Sun Microsystems as viewed through a browser from Netscape Communications, Inc. FIG. 3 illustrates the HTML source code which describes the hypertext document of FIG. 2.

The HTML markup language is analogous in some ways to the formatting codes used in word processing documents. A word processing document viewed through a word processing program is actually a combination of the text that you see and a series of hidden formatting codes (e.g., carriage return, bold, underline) which instruct the word processing program to display the word processing document in a specified way. Similarly, a hypertext document is actually a combination of the text that you see and a series of hidden "tags" or "anchors " (for new paragraphs, graphics images, hypertext links, etc.) which instruct the browser program to display the hypertext document in a specified way.

A hypertext document is usually broken down into sections, with each section delineated by one or more HTML tags. HTML tags are formatting codes surrounded by the characters < and > (less than and greater than symbols). Some HTML tags have a start tag and an end tag. In general, end tags are in the format </"symbol"> where the "symbol" is the character string found between the characters < and > in the start tag. FIG. 4 is an example of a series of HTML document tags forming a template for a typical hypertext document. For example, the document of FIG. 3 is defined as an HTML document using the tags <html> and </html>. Then the "head" to the document, which typically includes a title, is defined using the tags <head>, </head>, <title>, and </title>, respectively. Following the head comes the "body" of the document which is often organized into subtopics with different levels of headings. The body is defined by the tags <body> and </body>. Headings are indicated by the tags <h#> and </h#>, where # is the level of the heading. Heading levels indicate the relative size of the heading. Heading level 1 is the largest heading size and heading level 6 is the smallest heading size. Finally, it is good practice to indicate the author of the document at the bottom of the document using the tags <address> and </address>. FIG. 5 summarizes this information in a table format.

Once the HTML template has been established, text is added to create a basic hypertext document. In order to improve readability, the author adds HTML character and paragraph formatting tags to the document. For example, the <p> tag instructs the browser to begin a new paragraph. If an author wants to highlight some text in bold, the author inserts the <b> tag at the beginning of the text to be highlighted and inserts a </b> tag at the end of the text to be highlighted. The tags <i> and </i>indicate text to display in italics. FIG. 6 illustrates additional tags for formatting characters and paragraphs.

If HTML was merely made up of the document, paragraph, and character formatting tags discussed above, it would only allow an author to define a document which stands by itself. Fortunately, additional HTML tags allow an author to "link" documents together. If a reader of a hypertext document wants to know more about a topic before reading the rest of the current hypertext document, the reader selects a "link" or "hot link", which retrieves and displays a new document that provides related information. FIG. 7 illustrates a hypertext document (i.e, a "source file") on Thomas Jefferson with a hot link named "the American Constitution". The link could take the reader to a second hypertext document (i.e., a "destination file") which, for example, displays the text of the American Constitution or which provides more information on Thomas Jefferson's role in the drafting of the American Constitution.

Figure 8:
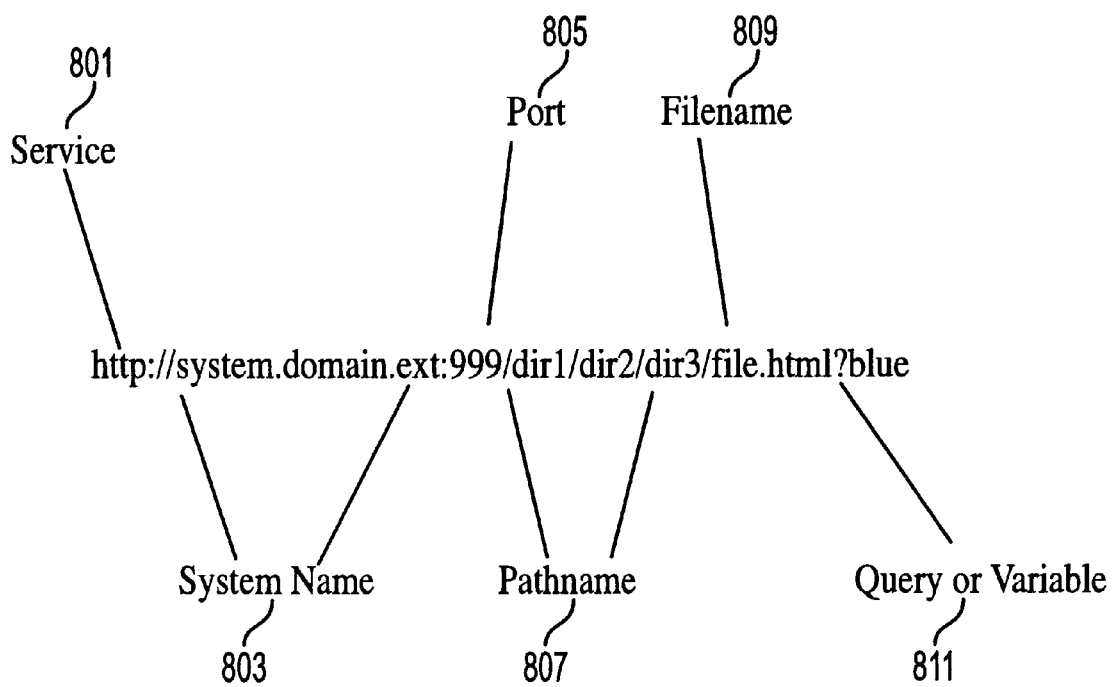
FIG. 8 illustrates the primary components of a Universal Resource Locator.

In HTML, a hot link to a destination file is made by placing a "reference anchor" around the text to be highlighted (e.g., "the American Constitution") and then providing a network location where the destination file is located. Reference anchors extend the idea of start and end tags. A reference anchor is created when the start tag <a> and the end tag </a> are placed around the text to be highlighted (e.g., <a> the American Constitution </a>). Then attribute information that identifies the network location of the destination file is inserted within the <a> reference tag. In HTML, the "href=" attribute, followed by the network location for the destination file, is inserted within the <a> tag. For example, <a href="network location for the destination file"> the American Constitution </a> illustrates the basic format for a reference anchor. On the web, network locations of hypertext documents are provided using the Universal Resource Locator ("URL") naming scheme. FIG. 8 illustrates the primary components of a URL.

A service type 801 is a required part of a URL. The service type tells the user's browser how to contact the server for the requested data. The most common service type is the HyperText Transport Protocol or http. The web can handle several other services including gopher, wais, ftp, netnews, and telnet and can be extended to handle new service types. A system name 803 is also a required part of a URL. The system name is the fully qualified domain name of the server which stores the data being requested. A port 805 ia an optional part of a URL. Ports are the network socket addresses for specific protocols. By default, http connects at port 80. Ports are only needed when the server does not communicate on the default port for that service. A directory path 807 is a required part of a URL. Once connected to the system in question, a path to the file must be specified. A filename 809 is an optional part of a URL. The file name is the data file itself. The server can be configured so that if a filename isn't specified, a default file or directory listing is returned. A search component 811 is another optional part of a URL. If the URL is a request to search a data base, the query can be embedded in the URL. The search component is the text after the ? or # in a URL.

Substituting the URL "http://system/dir/file.html" into the example above, the reference anchor:

<a href="http://system/dir/file.html/"> the American Constitution </a> identifies an html file to retrieve and display when a user selects "the American Constitution" hot link.

A POPUP Extension to the HTML Language

When the author of a web page wants to link in a footnote-style comment, he or she preferably adds the new POPUP attribute of the present invention to the <A> hypertext anchor tag. An example of this coding would be:

<A HREF=http://www.sun.com/books/nielsen.html POPUP>hypertext book</A>.

When the above piece of HTML code is examined and performed by program code enhanced to incorporate the teachings and suggestions of the present invention, the program code performs the steps illustrated below.

Detailed Description of one Embodiment

Figure 9:
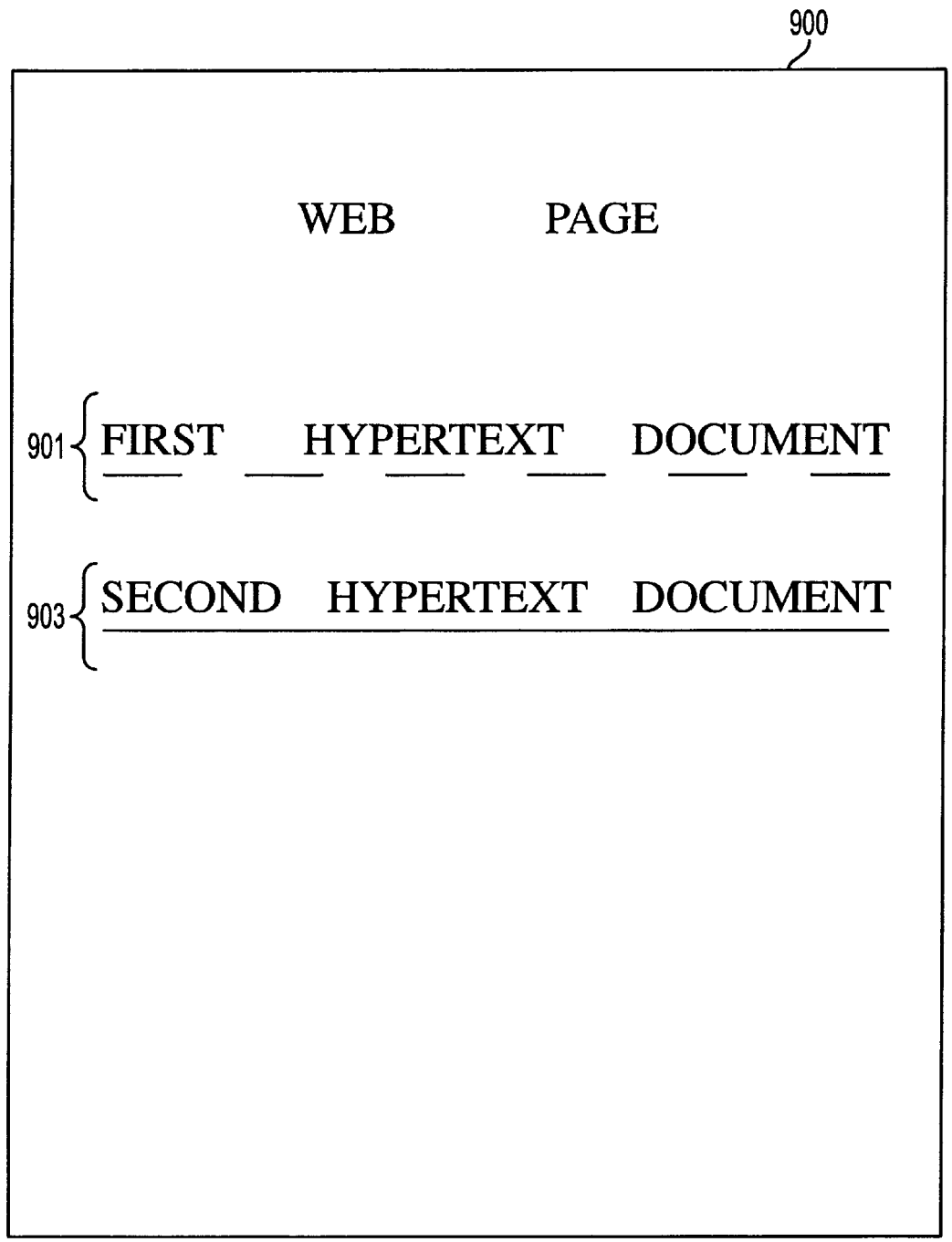
FIG. 9 illustrates a web page which displays a popup link and a replacement link.

The embodiment to be described below is perhaps best illustrated by way of example. This embodiment operates within the client/server environment of FIG. 1. A user of the client computer 101 invokes the browser 115 to retrieve a web file such as the source file 125. The web file contains code which, when examined and processed by the browser, produces a web page for display on the client computer's display device. In this embodiment, the web page is also known as an HTML page. A browser, such as the browser 115, that has been enhanced to incorporate the teachings and suggestions of the present invention displays a popup link (i.e., a hypertext link with a POPUP attribute) so as to distinguish the popup link from a replacement link. The preferred technique of this embodiment is to use a dotted underline to indicate the presence of the popup link a solid underline to indicate the presence of a replacement link. FIG. 9 illustrates a web page 900 which displays a popup link 901 and a replacement link 903.

Figure 10:
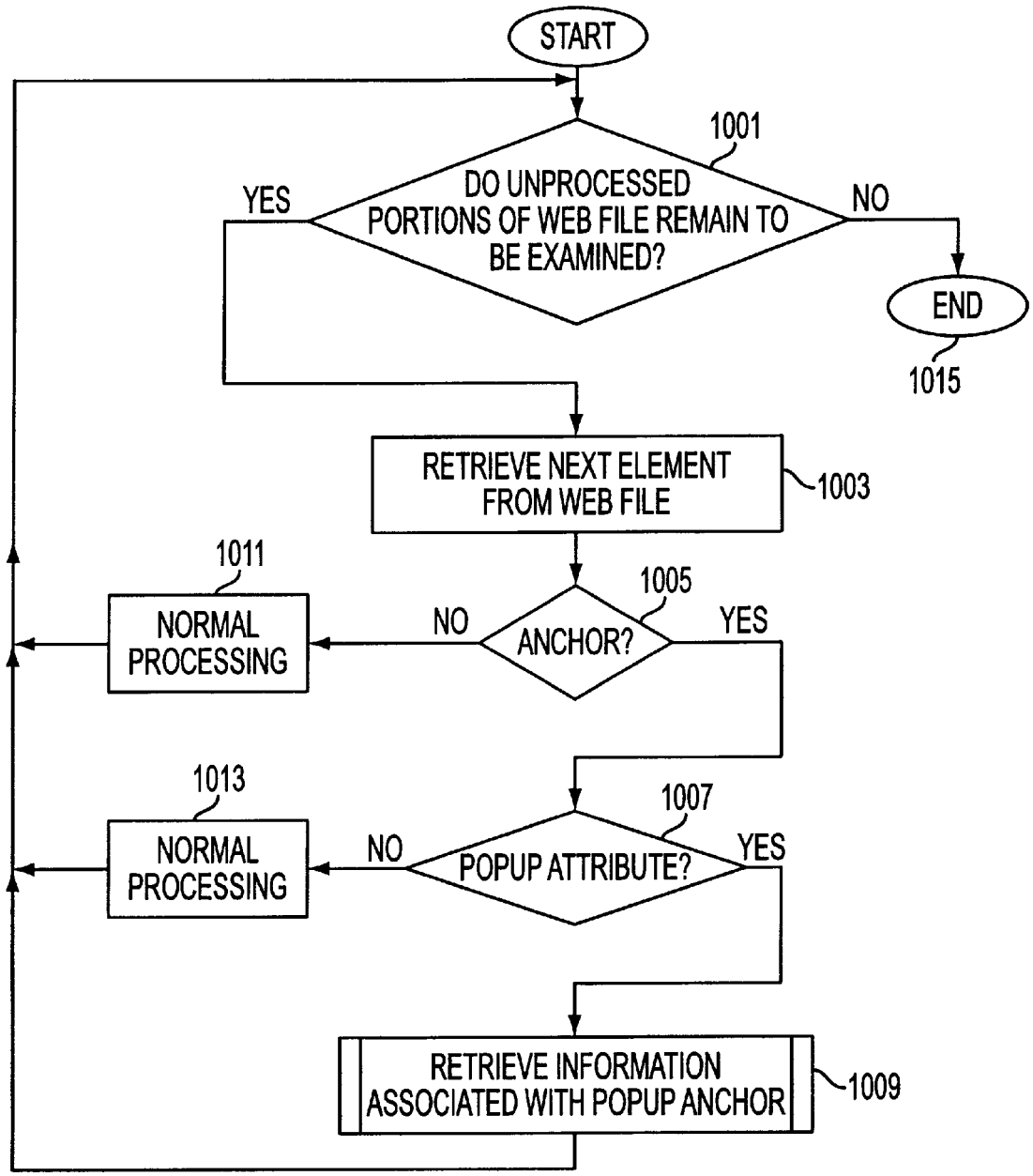
FIG. 10 illustrates the preferred steps for retrieving the files and embedded objects referenced by anchors with POPUP attributes.

When the browser 115 has finished retrieving the fall HTML page file and all the embedded objects on the page defined by the HTML file, it starts to retrieve all the files referenced by anchors with POPUP attributes such as destination file 135 from the second server 105. In addition, the browser retrieves any embedded objects referenced by the files it is retrieving. FIG. 10 illustrates the preferred steps for retrieving the files and embedded objects referenced by anchors with POPUP attributes. These files and objects are retrieved and kept in primary storage 111 as long as the current web page is being displayed on the client computer 101.

In step 1001, the method determines whether the entire web file has been examined and processed. If unprocessed portions of the web file remain then in step 1003 the method retrieves the next element from the web file. If the retrieved element is an anchor (step 1005) and a popup attribute (step 1007) then in step 1009 the method retrieves the information associated with the popup anchor. For example, the method retrieves the web file and the embedded objects referenced by the web file. Upon completion of step 1009, processing continues with step 1001. It should be noted that if the retrieved element is not a popup anchor (steps 1005 & 1007) then processing steps known in the prior art are performed.

When retrieving information associated with the popup anchor in step 1009, a number of different events may occur. The events and the preferred processing steps to be performed in response to the events is set forth immediately below.

If an error message is received from the server for a given web page referenced by a POPUP link, then that error message is stored in primary storage instead of the web page intended to be retrieved from the server.

If no reply is received from a server for a given web page referenced by a POPUP link, then an appropriately worded error message is stored in primary storage instead of the web page intended to be retrieved from the server. Preferably, the browser waits for five seconds after the first time it stored an error message for the web page and then tries to retrieve the web page again. Preferably, only one repeated attempt is made for each web page.

If the destination file was only partly retrieved at the time when the user requests to see the popup window, retrieval continues and the browser updates the popup window with any additional content as it comes in. If no information from the destination file has been stored in primary storage yet, the popup window is set to display an appropriate message (for example, "Waiting to retrieve popup content from servername", where servername is replaced with the name of the server—e.g., www.sun.com). This message is replaced with the content of the popup as it starts to appear or with the error message if an error is received or if the retrieval times out.

Figure 11:
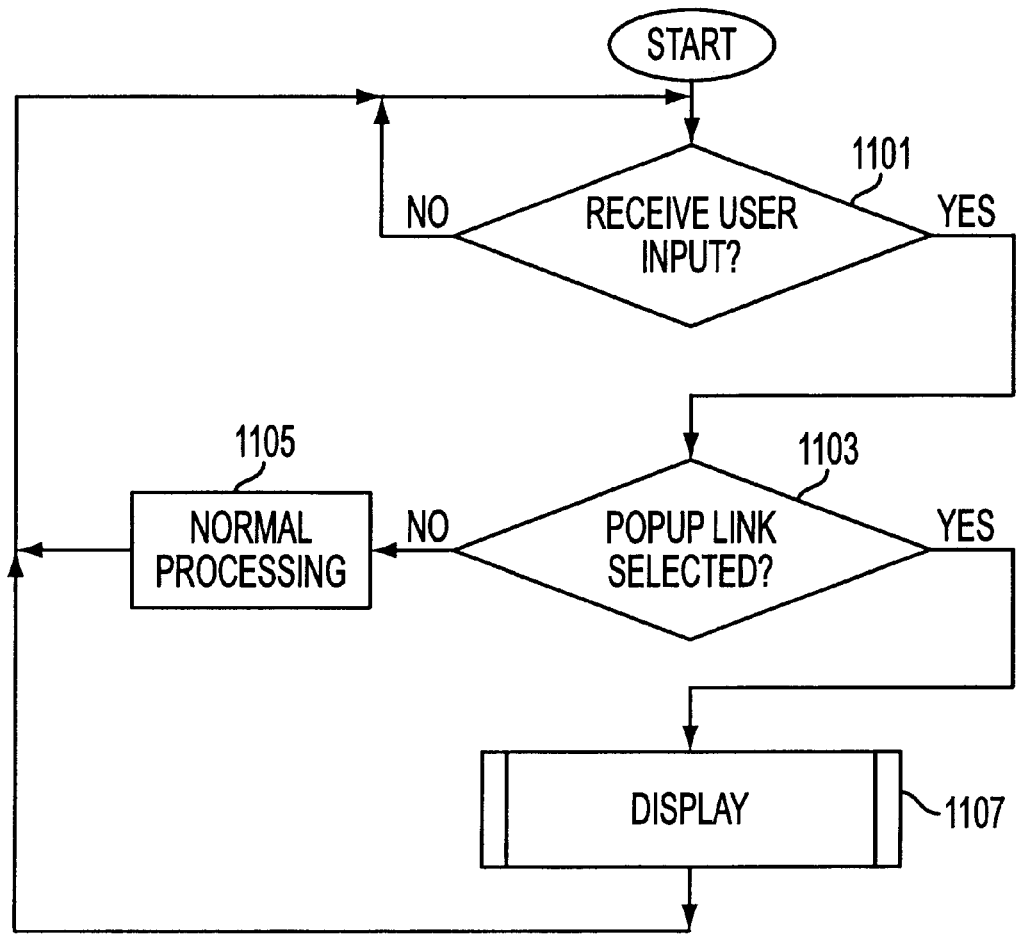
FIG. 11 illustrates the preferred steps for processing user input on a web page.
Figure 12:
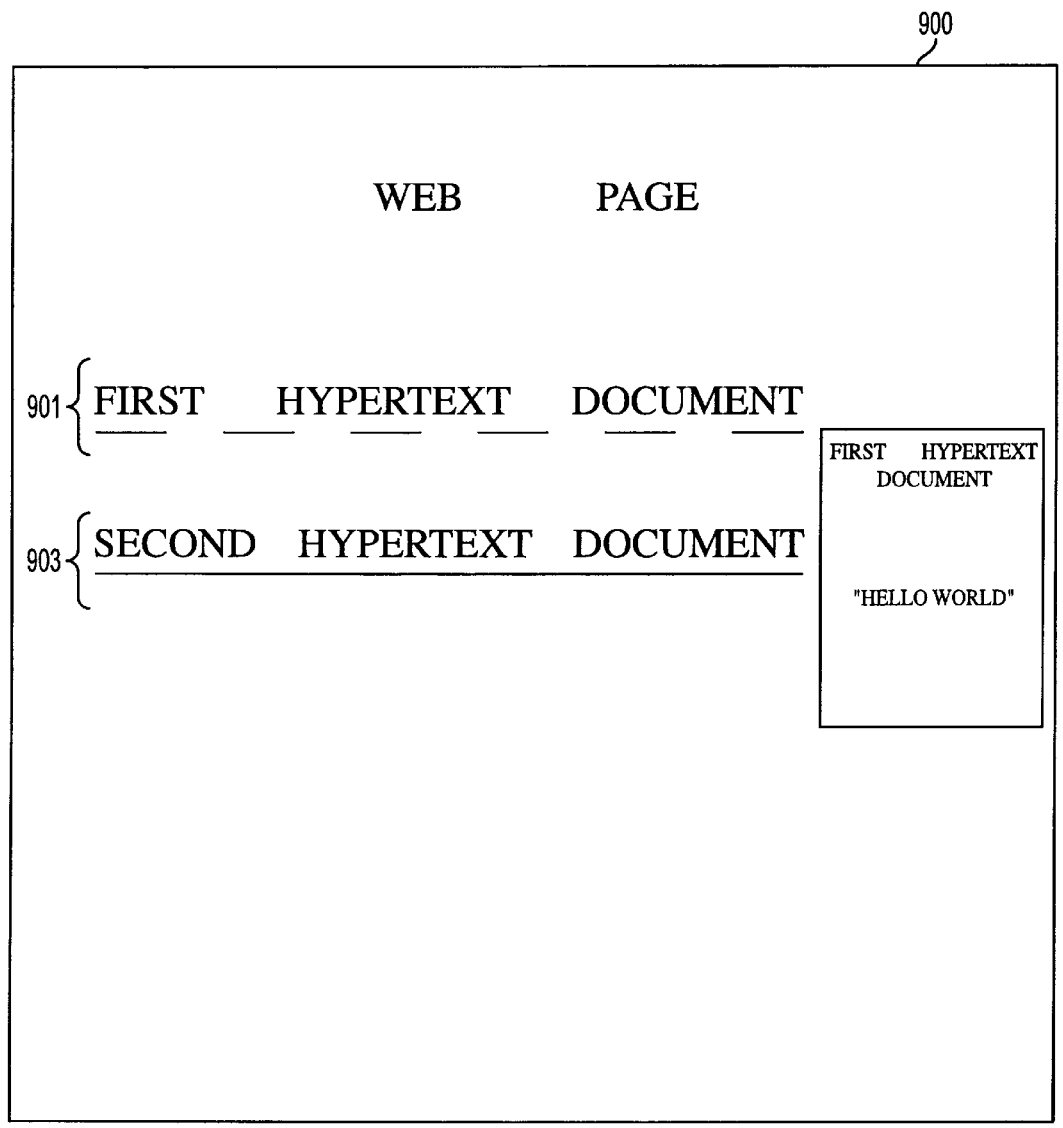
FIG. 12 illustrates a popup window superimposed over a main window in response to actuation of a popup link by the user.

Once the popup link has been displayed on the web page and the information retrieval process has been initiated, the browser accepts and processes user input on the web page. FIG. 11 illustrates the preferred steps for processing user input on a web page. In step 1101 the browser determines whether the user has entered input on the web page. If the user has not entered data on the web page then processing cycles back to step 1101. If it is determined that the browser has received user input then in step 1103 the user input is examined to determine if a popup link was selected. If the popup link was not selected then in step 1105 the browser performs normal processing familiar to the prior art on the user input. If the browser determines that the popup link was selected then the browser displays the information retrieved in step 1009 of FIG. 10 in a popup window. FIG. 12 illustrates a popup window 1201 superimposed over main window 900 in response to actuation of popup link 901 by the user. The information associated with the first hypertext document is the phrase "Hello World."

In the present embodiment, the user can activate a POPUP link and the associated popup window in at least three different ways. First, the popup destination is made visible in a separate small window only as long as the user keeps activating the popup link and automatically goes away as soon as the user stops activating the popup link. The preferred embodiment for this type of popup activation is that the user holds down the mouse button over the link anchor.

Second, the popup destination is displayed in a separate small window that goes away when either the user activates its close mechanism (typically by pulling down a menu and selecting the command CLOSE) or the user navigates from the main window and leaves the web page from which the small window was popped up. The preferred embodiment for this type of popup activation is that the user clicks the link anchor with a pointing device.

Third, the popup destination is displayed in a separate small window that goes away when the user activates its close mechanism. The popup destination continues to be displayed when the user navigates from the main window and leaves the web page from which the small window was popped up. The preferred embodiment for this type of popup activation is that the user double-clicks the link anchor.

The present embodiment also provides methods for determining the size of the popup window. The "popup window" preferably has a size that is the minimum of the following two criteria:

1) half the height and half the width of the main window;

2) the space needed to show the content of the destination file when using the same aspect ratio as that used in the main window.

If the "popup window" is determined from rule (1), then scrollbars are added to the popup window.

The present embodiment also provides methods for determining the starting location where the popup window will be displayed. The "popup window" is placed using the following rules: The corner where reading starts is preferably placed on the baseline of the popup link at five pixels after the end of the popup link. If the popup window will not fit fully on the screen with this placement it is moved in on the screen until it does fit. For a language that reads left-to-right and top-to-bottom, the "corner where reading starts" will be the upper left corner of the small window.

When the above piece of HTML code is interpreted by a browser that has not yet been enhanced to incorporate the present invention, the POPUP attribute is simply ignored. Thus, the hypertext link for the words "hypertext book" is rendered in the traditional way (normally as blue underlined text) and clicking on it will cause the browser to retrieve the file nielsen.html from the server www.sun.com and completely replace the current contents of the window with the contents of that file.

While specific embodiments have been described herein for purposes of illustration, various modifications may be made without departing from the spirit and scope of the invention. Accordingly, the invention is not limited to the above described embodiments but instead is defined by the appended claims in light of their full scope of equivalents.

What is claimed is:

1. A method executed in a network computer system for facilitating the display of information on a display device of a client computer, the network computer system including a server computer, the display device displaying a web page having at least one replacement link, the method comprising the steps of:

retrieving data associated with a popup link on the web page;

receiving an indication of an activation of a popup link displayed on the display device; and displaying the retrieved data in a popup window in response to the activation, wherein the data is an error message received from the server.

2. The method of claim 1 further comprising the step of waiting a predetermined amount of time after receiving the error message before reattempting to retrieve the data associated with the popup link.

3. A computer program product for facilitating the display of information on a display device of a client computer, the computer program product comprising:

code that retrieves from a server on a network to a client computer on the network data associated with a popup link on the web page;

code that receives an indication of an activation of the popup link; and code that displays the retrieved data in a popup window on the client computer in response to the activation, wherein the code resides on a tangible medium, wherein the data associated with the popup link is a file along with any embedded object identified by the file.

4. A computer program product for facilitating the display of information on a display device of a client computer, the computer program product comprising:

code that retrieves from a server on a network to a client computer on the network data associated with a popup link on the web page;

code that receives an indication of an activation of the popup link; and code that displays the retrieved data in a popup window on the client computer in response to the activation, wherein the code resides on a tangible medium, and wherein the data is an error message obtained by the client computer in response to a lack of response from the server after the client computer requests that the server send the client computer data associated with the popup link on the web page.

5. The computer program product of claim 4 further comprising code that waits a predetermined amount of time after receiving the error message before reattempting to retrieve the data associated with the popup link.

6. An apparatus for facilitating the display of information on a display device of a client computer, the display device displaying a web page having at least one replacement link, the apparatus comprising:

a mechanism configured to retrieve from a server data associated with a popup link on the web page;

a mechanism configured to receive an indication of an activation of a popup link displayed on the display device; and a mechanism configured to display the retrieved data in a popup window on the display device in response to the activation, further comprising:

a mechanism configured to retrieve the web page from the server; and a mechanism configured to render the web page on the display device, wherein the mechanism configured to render the web page further comprises a mechanism configured to render the popup link so that it is visually distinguished from the at least one replacement link displayed on the display device, and wherein the popup link is rendered using a dotted underline and the at least one replacement link is rendered using a solid underline.

7. The apparatus of claim 6 wherein the mechanism configured to retrieve data associated with the popup link is performed after the mechanism configured to retrieve the web page from the server has completed processing.

8. An apparatus for facilitating the display of information on a display device of a client computer, the display device displaying a web page having at least one replacement link, the apparatus comprising:

a mechanism configured to retrieve from a server data associated with a popup link on the web page;

a mechanism configured to receive an indication of an activation of a popup link displayed on the display device; and a mechanism configured to display the retrieved data in a popup window on the display device in response to the activation, wherein the data is an error message received from the server.

9. The apparatus of claim 8 further comprising a mechanism configured to wait a predetermined amount of time after receiving the error message before reattempting to retrieve the data associated with the popup link.

10. A method for the display of information on a display device of a computer, the method comprising the steps of:

retrieving data associated with a popup link on a web page that contains at least one replacement link;

receiving an indication of an activation of a popup link displayed on the display device; and displaying the retrieved data in a popup window in response to the activation.

11. The method of claim 10 wherein the step of rendering the web page further comprises the step of rendering the popup link so that it is visually distinguished from the at least one replacement link.

12. The method of claim 10 further comprising the step of retrieving data associated with the popup link after completion of retrieving the web page from a server.

* * * * *